United States Patent [19]

Elser et al.

[11] Patent Number: 4,460,721
[45] Date of Patent: Jul. 17, 1984

[54] ALCOHOL-SOLUBLE PRINTING INK OR VARNISH

[75] Inventors: Wilhelm Elser, Griesheim; Manfred Munzer, Bensheim, both of Fed. Rep. of Germany

[73] Assignee: Rohm GmbH Chemische Fabrik, Darmstadt, Fed. Rep. of Germany

[21] Appl. No.: 497,595

[22] Filed: May 24, 1983

[30] Foreign Application Priority Data

Jun. 3, 1982 [DE] Fed. Rep. of Germany ....... 3220909

[51] Int. Cl.$^3$ ............... C08F 22/026; C09D 11/02; C09D 5/00; C09D 3/12
[52] U.S. Cl. ........................... 524/35; 524/37; 524/39; 524/41; 524/377; 524/379; 524/558; 524/559
[58] Field of Search .............. 524/377, 37, 39, 41, 524/35, 379, 558, 559; 526/317

[56] References Cited

U.S. PATENT DOCUMENTS

| | | | |
|---|---|---|---|
| 3,481,735 | 12/1969 | Graver et al. | 96/1.5 |
| 4,357,267 | 11/1982 | Alberts et al. | 524/41 |
| 4,389,502 | 6/1983 | Fry et al. | 524/37 |
| 4,407,990 | 10/1983 | Hall et al. | 524/39 |

FOREIGN PATENT DOCUMENTS

| | | | |
|---|---|---|---|
| 0069936 | 1/1983 | European Pat. Off. | |
| 57-139150 | 8/1982 | Japan | 524/379 |
| 1459375 | 12/1976 | United Kingdom | |

OTHER PUBLICATIONS

Derwent Abst. 29143 D/17, Apr. 1981, BASF (DE2938308).
Derwent Abst. 07357 K/04, Jan. 1983, Bollig (DE3126549).
Derwent Abstract 44341 C/25, (5–1980) Daicel (J55062980).

*Primary Examiner*—Herbert J. Lilling
*Attorney, Agent, or Firm*—Oblon, Fisher, Spivak, McClelland & Maier

[57] ABSTRACT

A printing ink or varnish having a binder comprising isopropylmethacrylate and hydrophilic comonomers, particularly unsaturated carboxylic acids, their hydroxyalkyl esters, or a mixture thereof; preferably in combination with cellulose esters such as nitrocellulose, as an additional binder. The ink or varnish also contains dissolved or undissolved dyes, as well as a lower alkyl alcohol solvent. The printing and coatings thus produced are characterized by hardness and a high sealing stability.

16 Claims, No Drawings

ALCOHOL-SOLUBLE PRINTING INK OR VARNISH

BACKGROUND OF THE INVENTION

1. Field of the Invention

This invention relates to printing inks or varnishes containing a binder, a lower alcohol as a solvent, and, preferably, a dissolved or undissolved dye, particularly a pigment. Printing inks and varnishes of this type are used for printing on or varnishing of plastics, especially plastic film. Flexoprinting and roller printing are foremost among the printing processes.

2. Description of the Prior Art

Printing inks in alcohol solution are known from FR No. 1 512 257. They consist of 10-20% of a hydroxypropylester of acrylic or methacrylic acid, 1-5% of acrylic or methacrylic acid with the remainder being $C_{1-4}$ alkyl(meth)acrylates. For example, methyl or n-butyl esters are used as such alkyl(meth)acrylates. However, these binders are not sufficiently compatible with nitrocellulose in alcohol solution. The scratch resistance, coating hardness and weather resistance of printing produced with these printing inks are unsatisfactory.

Alcohol-soluble binders for flexoprinting inks and plastic varnishes are also described in DE No. 24 31 412. These binders are copolymers of ethylesters and hydroxyalkyl esters of acrylic and methacrylic acid. The printing inks produced with these binders result in hard, scratch- and weather-resistant printing, however, they are not compatible with nitrocellulose.

Therefore, a need continues to exist for a printing ink or varnish in alcohol solution which is fully compatible with alcohol-soluble cellulose esters, especially nitrocellulose, even though no glycol ethers or only very small quantitites of them are to be used as solvent components. Additionally, such a printing ink or varnish must be able to produce a printing of high heat-seal stability on plastic.

SUMMARY OF THE INVENTION

Accordingly, it is an object of this invention to provide a printing ink or varnish in an alcohol solution which is fully compatible with alcohol-soluble cellulose esters.

It is also an object of this invention to provide a printing ink or varnish in an alcohol solution which is fully compatible, in particular, with nitrocellulose.

Moreover, it is also an object of the present invention to provide a printing ink or varnish which permits printing with high heat-seal stability to be produced on plastic.

According to the present invention, the foregoing and other objects are attained by providing a printing ink or varnish comprising a copolymer of isopropyl methacrylate and at least one hydrophilic comonomer, and a solvent of a lower alkyl alcohol.

DETAILED DESCRIPTION OF THE PREFERRED EMBODIMENTS

Polyisopropyl methacrylate is completely soluble in ethyl alcohol; however, the solutions are not compatible with alcohol solutions of nitrocellulose. The same incompatibility is observed in copolymers of other acrylic or methacrylic esters with hydrophilic comonomers, such as acrylic and methacrylic acid and their hydroxyalkyl esters. Surprisingly, in contrast to all other copolymers of this type, the copolymers of isopropyl methacrylates and hydrophilic comonomers, are completely compatible with nitrocellulose in pure alcohol solution. Moreover, it is possible to use mixtures of binders from said copolymers and alcohol-soluble cellulose esters and to achieve improved sealing stability. Other advantages resulting from the use of said copolymers are good pigmentation, hardness and the good plasticizer barrier effect of the printing product especially on plastic films. All of these advantages are attained without applying sizable quantities of expensive glycol ethers as a solvent component. The latter will be used—if at all—only in small quantities if required for other reasons pertaining to application.

The printing ink and varnishes of the present invention are suitable for flexoprinting and roller printing on various substrates and preferably on plastic films. An important field of application is the printing of ductile PVC films from which heat-sealable packaging containers are produced. Furthermore, similarly produced varnishes can be used for the coating of films and other substrates. Kiss-roll coating, spraying and other coating processes are also possible.

Of the total weight, the printing inks and varnishes according to the invention preferably contain 10-30% by weight of binders. When pigments are used, their share in the total weight generally amounts to 0.5-20% by weight. The usual printing ink pigments in powder or paste form are used. Soluble dyes can be applied in a much smaller quantity, for example starting with 0.1% by weight.

Lower alkyl alcohols are used as solvents; these are the $C_{1-4}$ alcohols. Of these, ethyl alcohol and isopropyl alcohol are primarily used. However, ethyl alcohol is preferred. Small quantities of water, generally no more than 5-10%, can also be used. Furthermore, to improve the flow characteristics, small quantities of glycol ether, for example 5-10% of the total weight of the solvent, can also be used.

The binder may consist only of the copolymer of the isopropyl methacrylate; however, mixing it with an alcohol-soluble cellulose ester is particularly advantageous. In addition to alcohol-soluble cellulose acetates and butyrates, alcohol-soluble nitrocellulose deserves particular mention. Its nitrogen content preferably is between 10.6 and 11.2% by weight. The mixing ratio between the copolymer and the cellulose ester preferably is in the range of from 20:80 to 80:20.

The copolymer preferably contains 30-90% by weight of isopropyl methacrylate. The hydrophilic comonomers preferably form 10-70% by weight of the copolymer and, as a rule, are supplemented with isopropyl methacrylate to 100%. However, limited quantities, preferably at most 30% by weight of the copolymer can consists of nonhydrophilic comonomers, such as the lower acrylic or methacrylic esters, if the alcohol solubility and the compatibility with cellulose esters can be maintained.

Hydrophilic comonomers according to the invention are those that, at room temperature result in at least 5%, preferably at least 10%, aqueous solutions. The most important examples of these comonomers are $\alpha,\beta$-unsaturated polymerizable carboxylic acids, such as acrylic and methacrylic acid or possibly maleic, fumaric or itaconic acid as well as hydroxyalkyl esters of these acids, especially hydroxy ester of acrylic or methacrylic acid with $C_{2-4}$ glycols.

The hydrophilic comonomers improve alcohol solubility and compatibility with nitrocellulose. Since high proportions of acid monomers can considerably reduce water stability of the printing, unsaturated carboxylic acids preferably are used in combination with said hydroxy alkylesters to produce the copolymer. The proportion of unsaturated carboxylic acid preferably is between 5 and 30% by weight and the proportion of the hydroxyalkyl ester is at least 5% by weight based on the total weight of the copolymer.

The reduced viscosity of the copolymer determined in the dimethyl formamide solution at 20° C., is preferably below 50 ml/g, preferably in the range of 20–30 ml/g. These viscosity values can be attained in the production of the copolymer in the generally known manner by also using transfer regulators.

The present invention will be further illustrated by certain examples and references which are provided for purposes of illustration only and are not intended to limit the present invention.

EXAMPLES

1. Production of a Binder

A mixture of 70 parts by weight of isopropylmethacrylate, 20 parts by weight of methacrylic acid and 10 parts by weight of 2-hydroxy propylacrylate is polymerized while adding 0.1% dilauroyl peroxide as initiator and 0.5% n-dodecyl mercaptan as a molecular weight regulator in a film tube at a temperature of 50° C. in a water bath for 40 hours. To lower the residual monomer content, the resulting polymer is after-baked for 10 hours at 100° C. in the dryer. $\eta$ sp/c (measured at 20° C. in dimethyl formamide) 37 ml/g.

2. Comparison Test

A mixture of 76% by weight of ethylmethacrylate, 8% by weight of methacrylic acid and 16% by weight of 2-hydroxylpropyl methacrylate is polymerized by adding 0.2% by weight of dilauroyl peroxide and 0.07% by weight of thioglycol under the conditions cited in Example 1. $\eta$ sp/c (measured at 20° C. in dimethyl formamide) 32 ml/g.

3. Production of Overprint Shellac

Ten parts by weight of the polymer produced in Example 1 and 10 parts by weight of 100% nitrocellulose A 400 (nitrocellulose of the firm of Wolff & Co., Walsrode, is delivered moistened with 35% ethyl alcohol) are dissolved in 76 parts of ethyl alcohol and 4 parts of ethylene glycol monoethylether.

This varnish is clear and does not show any precipitation even with temperatures cooled down to 0°–5° C.

To determine the sealing stability, the varnish is applied and dried on an aluminum sheet with a 5–10 μm dry-coat thickness. The test is made with a heat-contact hot-seal device type HSG/ET of the firm of Otto Brugger, Munich. Under sealing conditions, no sticking was noted of the varnished aluminum sheet against unvarnished aluminum at temperatures of 180° C. under a pressure of 3 kg/cm² for one second, i.e., the coat keeps the sealing stable up to this temperature.

With the polymer mentioned in comparison test (2), an overprint varnish of the above-mentioned composition cannot be produced because it does not have solubility or nitrocellulose compatibility. Good compatibility can be achieved in this case only if the proportion of the ethylene glycol monoethyl ether in the solvent mixture is at least 50%, something that is not justifiable for reasons of varnish and printing technology.

4. Production of a Printing Ink

The above-mentioned overprinting varnish was pigmented with black iron oxide in a laboratory dispersing device. The ratio of pigment:binder was 1:2.

Coats of this printing ink showed the required stability to soap required in printing inks on packages according to DIN 16524.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A printing ink or varnish which is compatible with at least one alcohol-soluble cellulose ester and which comprises a binder comprising a copolymer which consists of isopropyl methacrylate and at least one hydrophilic comonomer, and a solvent comprising about 80% or more of a lower alkyl alcohol.

2. The printing ink or varnish according to claim 1, wherein said binder comprises 10 to 30%, by weight, of said printing ink or varnish.

3. The printing ink or varnish according to claim 1, wherein said copolymer comprises 30 to 90%, by weight, of isopropyl methacrylate and 10 to 70%, by weight, of at least one hydrophilic comonomer.

4. The printing ink or varnish according to claim 1, wherein said hydrophilic comonomer or comonomers is an unsaturated polymerizable carboxylic acid, a hydroxyalkyl ester of an unsaturated polymerizable carboxylic acid, or a mixture thereof.

5. The printing ink or varnish according to claim 4, wherein said copolymer comprises 5 to 30%, by weight, of the unsaturated polymerizable carboxylic acid, and at least 5%, by weight, of the hydroxyalkyl ester of the unsaturated polymerizable carboxylic acid.

6. The printing ink or varnish according to claim 4, wherein said unsaturated polymerizable carboxylic acid is an $\alpha,\beta$-unsaturated polymerizable carboxylic acid selected from the group consisting of acrylic acid, methacrylic acid, maleic acid, fumaric acid or itaconic acid.

7. The printing ink or varnish according to claim 4, wherein said hydroxyalkyl ester of the unsaturated polymerizable carboxylic acid is a hydroxy ester of acrylic acid or methacrylic acid and a $C_2$–$C_4$ glycol.

8. The printing ink or varnish according to claim 1, wherein the binder further comprises an alcohol-soluble cellulose ester, wherein the ratio of said copolymer to said alcohol-soluble cellulose ester is 20:80 to 80:20 parts by weight.

9. The printing ink or varnish according to claim 8, wherein the alcohol-soluble cellulose ester is selected from the group consisting of alcohol-soluble cellulose acetates, cellulose butyrates and nitrocellulose.

10. The printing ink or varnish according to claim 1, wherein said lower alkyl alcohol is a $C_1$–$C_4$ alcohol.

11. The printing ink or varnish according to claim 10, wherein said lower alkyl alcohol is ethyl alcohol or isopropyl alcohol.

12. The printing ink or varnish according to claim 1, wherein said solvent further comprises 5 to 10%, by weight, of glycol ether, based on the total weight of the solvent.

13. The printing ink or varnish according to claim 1, which further comprises a pigment in the amount of 0.5 to 20% by weight, based on the total weight.

14. The printing ink or varnish according to claim 1, which further comprises a soluble dye in the amount of at least 0.1% by weight, based on the total weight.

15. The printing ink or varnish according to claim 1, wherein said copolymer has a reduced viscosity determined in a dimethyl formamide solution at 20° C. of less than 50 ml/g.

16. The printing ink or varnish according to claim 15, wherein said copolymer has a reduced viscosity determined in a dimethyl formamide solution at 20° C. in the range of 20 to 30 ml/g.

* * * * *